US012656517B2

(12) United States Patent
Hunt et al.

(10) Patent No.: US 12,656,517 B2
(45) Date of Patent: Jun. 16, 2026

(54) INDUCTION LOOP FOR MINERAL EXPLORATION

(71) Applicant: KoBold Metals Company, Berkeley, CA (US)

(72) Inventors: Thomas Hunt, Berkeley, CA (US); Kurt Z. House, Berkeley, CA (US)

(73) Assignee: KoBold Metals Company, Berkeley, CA (US)

( * ) Notice: Subject to any disclaimer, the term of this patent is extended or adjusted under 35 U.S.C. 154(b) by 195 days.

(21) Appl. No.: 18/744,186

(22) Filed: Jun. 14, 2024

(65) Prior Publication Data

US 2024/0418898 A1 Dec. 19, 2024

Related U.S. Application Data

(60) Provisional application No. 63/521,532, filed on Jun. 16, 2023.

(51) Int. Cl.
*G01V 3/10* (2006.01)
*G01V 3/165* (2006.01)
*G01V 13/00* (2006.01)

(52) U.S. Cl.
CPC .............. *G01V 3/105* (2013.01); *G01V 3/165* (2013.01); *G01V 13/00* (2013.01)

(58) Field of Classification Search
CPC ........ G01V 3/105; G01V 3/165; G01V 13/00; G01V 3/10
See application file for complete search history.

(56) References Cited

U.S. PATENT DOCUMENTS

| | | | |
|---|---|---|---|
| 7,646,201 B2 | 1/2010 | Miles et al. | |
| 9,645,274 B2 | 5/2017 | Miles et al. | |
| 2004/0000919 A1* | 1/2004 | Gupta | G01V 3/10 |
| | | | 324/693 |

(Continued)

FOREIGN PATENT DOCUMENTS

WO WO 2012/151695 11/2012

OTHER PUBLICATIONS

International Search Report and Written Opinion in International Application No. PCT/US2024/034105, mailed on Sep. 11, 2024, 14 pages.

*Primary Examiner* — Giovanni Astacio-Oquendo
(74) *Attorney, Agent, or Firm* — Fish & Richardson P.C.

(57) ABSTRACT

Systems and methods for electromagnetic induction include a first electrically conducting loop including multiple lengths of electrically conductive tubing, each length of electrically conductive tubing at least partially composed of a first electrically conducting composite material with a specific conductivity higher than aluminum, the plurality of lengths of electrically conductive tubing being connected to form a rigid closed loop having a perimeter of 3 meters or more. A second electrically conducting loop is electrically isolated from the first electrically conducting loop. A control module includes a signal generator in electrical communication with the first electrically conducting loop and configured to vary a current in the first electrically conducting loop to periodically apply an excitation magnetic field to a volume proximate to the first electrically conducting loop and to detect, using the second electrically conducting loop, changes in a magnetic field generated by a substance in the volume.

22 Claims, 5 Drawing Sheets

(56)  References Cited

U.S. PATENT DOCUMENTS

| | | | |
|---|---|---|---|
| 2008/0054903 A1* | 3/2008 | Possanzini | G01R 33/341 |
| | | | 324/322 |
| 2011/0001480 A1 | 1/2011 | Kuzmin et al. | |
| 2013/0328692 A1 | 12/2013 | Johannessen | |
| 2015/0048834 A1 | 2/2015 | Allen | |
| 2017/0068014 A1 | 3/2017 | Miles et al. | |
| 2022/0206091 A1* | 6/2022 | Brunner | G01R 33/34076 |

* cited by examiner

100

110

120

126

126

126

124

126

122

INDUCTION LOOP FOR MINERAL EXPLORATION

CLAIM OF PRIORITY

This application claims priority to U.S. Provisional Application Ser. No. 63/521,532, filed on Jun. 16, 2023, the entire contents of which are hereby incorporated by reference.

TECHNICAL FIELD

The disclosure relates to induction loops for mineral exploration in subterranean formations.

BACKGROUND

Electromagnetic induction has been used for identifying ore bodies and electromagnetic anomalies in subterranean formations. The response of conductive bodies in the ground to induced current in an airborne loop can be used to understand overall geology as well as for direct detection of conductive ore bodies. For example, electromagnetic induction has been used to locate conductive massive sulfide deposits, or structures with high magnetic susceptibility. Both airborne and ground current loops can be used.

SUMMARY

This disclosure describes methods and systems for identifying mineral deposits in a subterranean formation. An electromagnetic induction loop can be towed by an airborne vehicle or placed on the ground to perform a mineralogical survey of a target subterranean formation. The electromagnetic loop includes a rigid, electrically conductive support frame. Electrical current can be applied directly to the rigid support frame without including additional electrical conductor coils within the support frame. The support frame can include materials with high specific conductivity, for example, aluminum, beryllium, or graphene.

In one aspect, an electromagnetic induction system includes a first electrically conducting loop including multiple lengths of electrically conductive tubing, each length of electrically conductive tubing being at least partially composed of a first electrically conducting composite material with a specific conductivity higher than aluminum, each length of the plurality of lengths of electrically conductive tubing being connected to form a rigid closed loop having a perimeter of 3 meters or more; a second electrically conducting loop electrically isolated from the first electrically conducting loop; and a control module including a signal generator in electrical communication with the first electrically conducting loop and configured, during operation of the system, to vary a current in the first electrically conducting loop to periodically apply an excitation magnetic field to a volume proximate to the first electrically conducting loop and to detect, using the second electrically conducting loop, changes in a magnetic field generated by a substance in the volume responsive to the excitation magnetic field.

In one aspect, a method includes providing multiple lengths of electrically conductive tubing, each length of electrically conductive tubing being at least partially composed of a first electrically conducting composite material with a specific conductivity higher than aluminum; assembling the plurality of lengths of electrically conductive tubing to form a rigid closed electrically conducting loop, the rigid closed electrically conducting loop having a perimeter of 3 meters or more; generating an excitation magnetic field by applying an electrical current to the rigid closed electrically conducting loop; and detecting changes in a volume proximate the rigid closed electrically conducting loop responsive to the excitation magnetic field.

In one aspect, an electromagnetic surveying system includes a tow assembly connected to an aircraft, the tow assembly including a first electrically conducting loop comprising multiple lengths of electrically conductive tubing, each length of electrically conductive tubing being at least partially composed of a first electrically conducting composite material with a specific conductivity higher than aluminum, each length of the plurality of lengths of electrically conductive tubing being connected to form a rigid closed loop having a perimeter of 3 meters or more; a second electrically conducting loop electrically isolated from the first electrically conducting loop; and a control module comprising a signal generator in electrical communication with the first electrically conducting loop and configured, during operation of the system, to vary a current in the first electrically conducting loop to periodically apply an excitation magnetic field to a volume proximate to the first electrically conducting loop and to detect, using the second electrically conducting loop, changes in a magnetic field generated by a substance in the volume responsive to the excitation magnetic field Examples of these aspects can include one or more of the following features.

In some examples, the first electrically conducting composite material is a metal matrix composite material comprising aluminum and a material with a specific conductivity higher than aluminum.

In some cases, the metal matrix composite material comprises aluminum and beryllium.

In some examples, a transverse section of at least one of the lengths of electrically conductive tubing comprises an airfoil shape.

In some cases, the airfoil shape is a symmetric airfoil shape.

In some examples, the first electrically conducting loop further includes one or more wire loops disposed within the plurality of lengths of electrically conductive tubing, the one or more wire loops including a material with a specific conductivity higher than aluminum.

In some examples, the second electrically conducting loop includes a second plurality of lengths of electrically conductive tubing at least partially composed from a second electrically conducting material selected from the group consisting of aluminum, beryllium, and graphene.

In some examples, these aspects further include ropes or cables coupled to the first electrically conducting loop and the second electrically conducting loop, and configured to be coupled to a tow vehicle.

In some examples, these aspects include inserting one or more wires within the rigid closed electrically conducting loop, the one or more wires including a material with a specific conductivity higher than aluminum.

In some examples, the assembling includes joining the plurality of lengths of electrically conductive tubing with threaded connections or press-fit connections.

In some examples, applying an electrical current includes applying an electrical current of at least 1 kA.

In some examples, these aspects further include controlling the electrical current by a control module.

In some examples, these aspects include surveying a geological area by towing the rigid closed electrically conducting loop with an aircraft over the geological area. In some examples, the tow assembly further includes ropes or cables coupled to the first electrically conducting loop, the second electrically conducting loop, and the aircraft.

The methods and systems enable one or more of the following technical advantages. For example, the electromagnetic loops can be relatively light compared to similar loops that are supported by a rigid frame. Lighter loops reduce fuel consumption of an aircraft towing the loop, decreasing costs of conducting the survey and increasing the distance that can be traversed by the aircraft before refueling. Additionally, the cross-sectional shape of the electromagnetic loop can be chosen to reduce drag, and/or generate lift to further reduce the fuel consumption of the helicopter providing cost savings. Alternatively, or additionally, the electromagnetic loops can be relatively easy to assemble and disassemble at a survey location compared to alternative loops that include separate frames and conductors. For instance, the electromagnetic loops can include fewer parts because the conducting elements are themselves rigid and don't not need a separate frame to provide the necessary rigidity.

Other advantages will be apparent from the description below, the figures, and the claims.

DESCRIPTION OF DRAWINGS

In the drawings, like reference numbers denote like elements.

DETAILED DESCRIPTION

Figure 1:
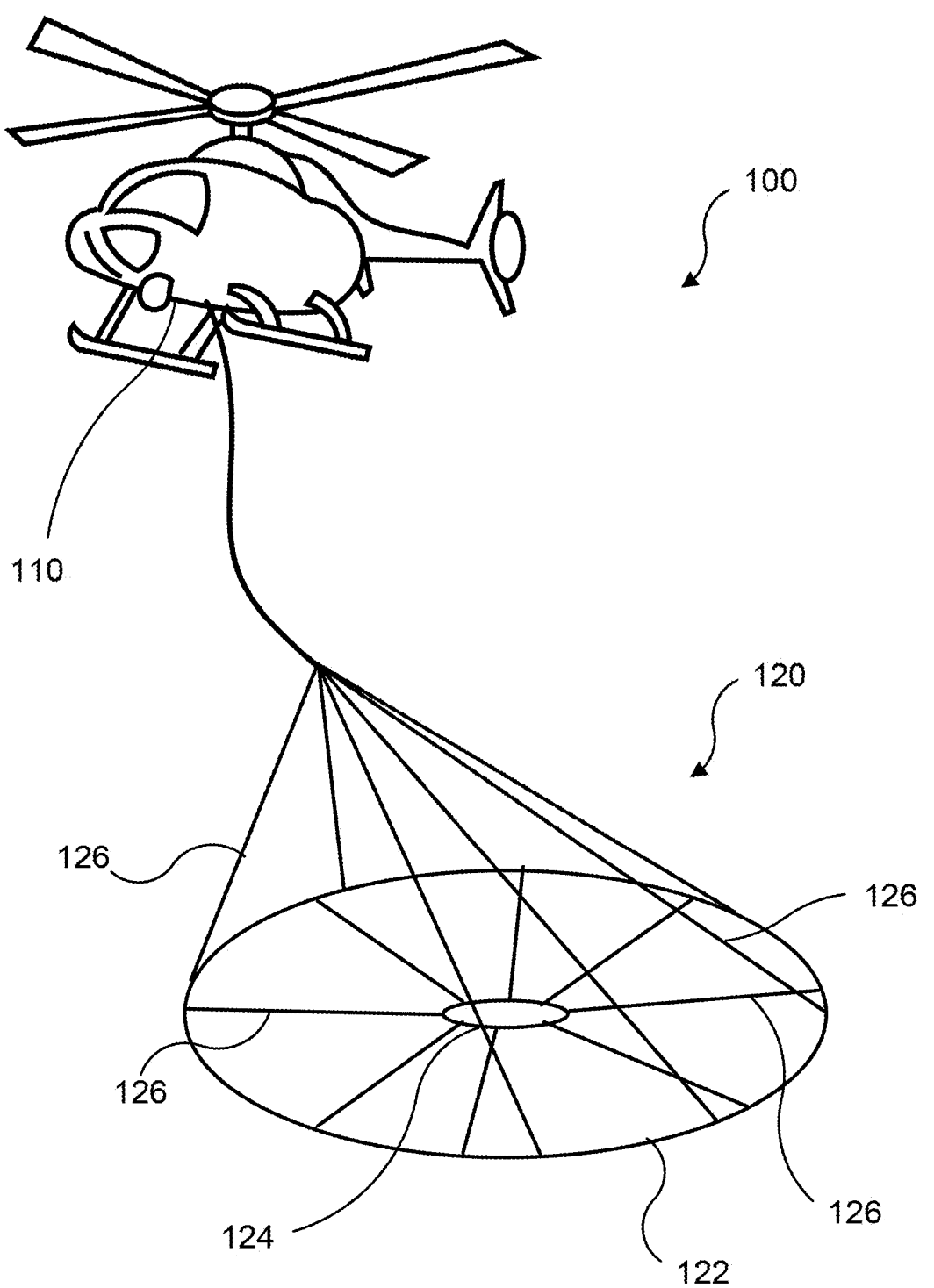
FIG. 1 illustrates an example airborne electromagnetic induction system.

Referring to FIG. 1, an example airborne electromagnetic surveying system 100 includes a helicopter 110 and a tow assembly 120. The tow assembly 120 includes an electromagnetic source loop 122 and an electromagnetic receive loop 124. The source loop 122 and the receive loop 124 are arranged concentrically. The source loop 122 and receive loop 124 is attached to the tow assembly 120 using ropes or cables 126.

In use, the helicopter 110 can fly in a predefined pattern to survey a target subterranean formation. The helicopter tows the source loop 122 and receive loop 124 in proximity to the surface of a target subterranean formation. An electrical current is provided to the source loop 122 inducing a magnetic field. The strength of the magnetic field depends on the magnitude of the current provided to the source loop 122. Changes in the magnetic field of the source loop 122 can induce a current in features in the subterranean formation. The current in the subterranean formation can generate a secondary magnetic field. Changes in the secondary magnetic field can be detected by the receive loop 124, for example, by detecting changes of an induced current in the receive loop 124. Changes in the current of the receive loop 124 can be used to detect mineral deposits in the subterranean formation.

In some implementations, the source loop 122 is placed on the ground instead of being airborne. The receive loop 124 can be moved relative to the source loop 122 to perform a mineralogical exploration survey.

Figure 2:
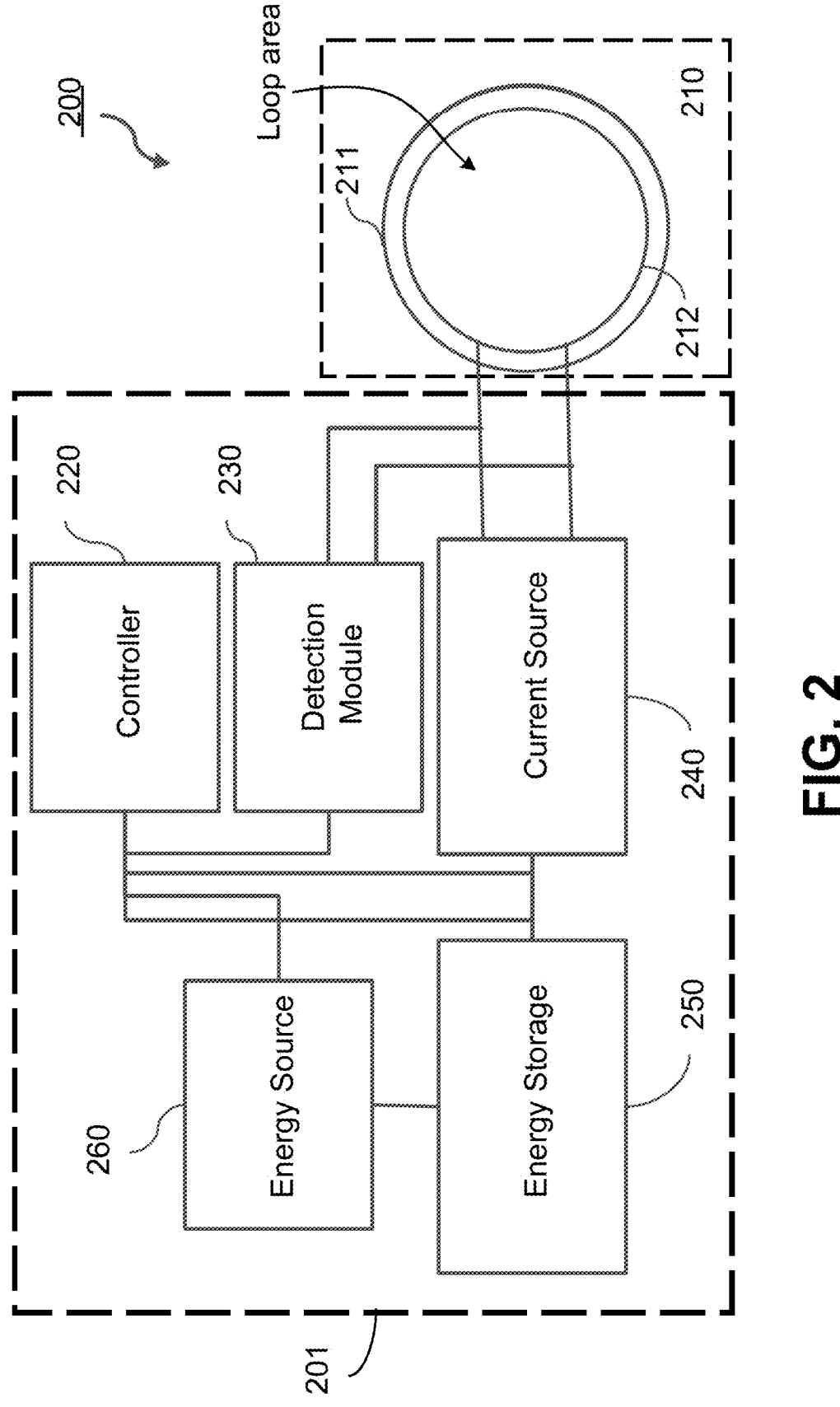
FIG. 2 is a block diagram of an example electromagnetic induction system.

Referring to FIG. 2, an induction detection system 200 includes a pair of loops 210 connected to a control module 201. Loops 210 include a source loop 211 and a receive loop 212 that may share a common axis, have axes offset relative to each other, or have axes slightly tilted with respect to each other. Control module 201 includes a controller 220 (e.g., a computer), a detection module 230, a current source 240, energy storage system 250 (e.g., capacitor bank, battery), and an energy source 260 (e.g., a generator, battery, fuel cell, renewable source, mains). Controller 220 controls and synchronizes operation of the detection module 230, current source 240, energy storage 250, and energy source 260. Generally, the loop 210 has an area (in a plane orthogonal to the loop axis) suitable for use in subterranean mineral exploration. For example, the loop can have an area of $10 \text{ m}^2$ or more (e.g., $100 \text{ m}^2$ or more, $1,000 \text{ m}^2$ or more).

During use, system 200 periodically pulses current through source loop 210 and then uses receive loop 212 to pick up the change in magnetic field during or after the current pulse through the loop. When oriented with the loop parallel (e.g., substantially parallel, precisely parallel, within about 20% of parallel) to the earth's surface, the strength of the induced current in the subsurface, which generates a signal in the detection module 230 via the receive loop 212, is proportional to the magnetic field produced by the source loop 211. The signal to noise ratio is typically proportional to the current in the loop forming the source loop 211. Increased current and loop magnetic field strength can lead to improved signal to noise in the detection module 230 and deeper or more accurate identification of geological structures of interest. The detection module 230 can apply signal processing algorithms (e.g., digital filters, peak finding algorithms, thresholding algorithms) to the generated signal to detect changes in the magnetic field.

The magnetic field strength generated by loop 210 can vary as desired and is generally sufficient to produce a detectable response from a subterranean deposit of interest. In some embodiments, the magnetic field strength can be 10 Gauss or more (e.g., 15 Gauss or more, 20 Gauss or more).

Increasing the magnitude of the magnetic moment of an electromagnetic survey system can induce greater currents in underground targets leading to larger, more easily measurable signals reaching the receive loop. The magnitude of the magnetic moment for a current loop is the product of the current in the loop and the area of the loop. To increase the magnitude of the magnetic moment, the current in the loop can be increased and/or the area of the loop can be increased. Current is often limited by the resistance of the loop. The area of the loop can be limited by the weight and rigidity of the loop. Loop weight should be minimized for airborne applications. Additionally, the loop can be configured to allow for easy transport and assembly in the field.

The loop 210 includes a rigid structure and an electrical conductor. In some implementations, the rigid structure and electrical conductor are the same element. For example, the loop 210 can include aluminum, an aluminum alloy, or an aluminum composite, which can carry the electrical current and the structural load. In such implementations, the loop 210 may not have additional coils of wire running through the rigid structure, and the current is provided directly to the rigid structure of the loop 210. The rigid structure of loop 210 maintains the shape of the loop during operation without additional support. For example, the rigid structure of loop 210 includes materials with high values of elastic modulus such as 50 GPa or more, 70 GPa or more, 100 GPa or more, 150 GPa or more, 1000 GPa or less.

Figure 3:
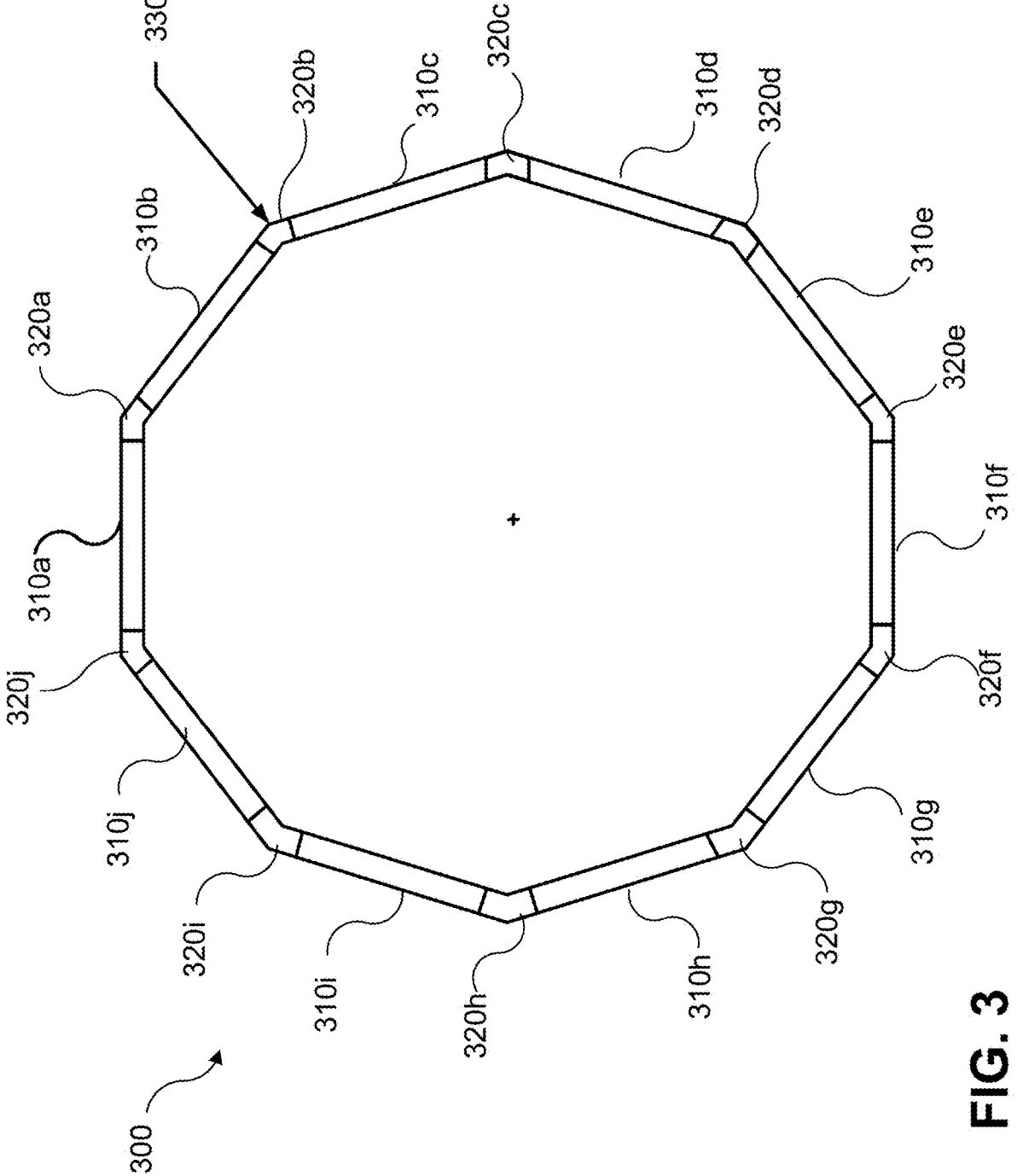
FIG. 3 illustrates an example electromagnetic induction loop.

FIG. 3 illustrates a plan view of an example inductance loop 300 (e.g., the source loop 211). The inductance loop 300 includes multiple lengths of tubing 310a-j. The lengths of tubing 310a-j are connected to each other through joints 320a-j. For example, the length of tubing 310a is connected to the length of tubing 310b via the joint 320a. Although ten lengths of tubing are illustrated in FIG. 3, any reasonable number of lengths of tubing and joints can be used (e.g., 6 or more lengths of tubing, 8 or more lengths of tubing, 12 or more lengths of tubing, 20 or more lengths of tubing, 100 or more lengths of tubing). The lengths of tubing can have any reasonable length, for example, 1 m or more, 2 m or more, 5 m or more, 10 m or more. The radius 330 of the loop 300 can be, for example, 6 m or more, 8 m or more, 10 m or more, or 30 m or less. The perimeter of the loop 300 can be, for example, 3 m or more, 10 m or more, 20 m or more, 50 m or more, 200 m or less. The mass of the loop 300 can be, for example, 100 kg or more, 200 kg or more, 500 kg or more, or 1000 kg or less. The joints 320a-j can be any type of mechanical joint. For example, the joint can be a press-fit joint, a threaded joint, or a bolted joint. The lengths of tubing 310a-j and joints 320a-j can be transported to the survey site disassembled. The loop 300 can be assembled at the survey site by joining the lengths of tubing 310a-j and the joints 320a-j. In some implementations, the joints 320a-j are integral with the lengths of tubing 310a-j.

Electrical current is applied directly to the structure of the loop 300. The current in the loop can be, for example, 1 kA or more, 2 kA or more, 5 kA or more, 30 kA or less. The lengths of tubing 310a-j are made from a material that has a high electrical conductivity per unit mass (e.g., specific conductivity) and that can also form the rigid structure of the loop 300. A material with a high specific conductivity has a lower resistivity and can conduct larger currents than materials with lower specific conductivity. For example, the lengths of tubing can be made from aluminum or an aluminum alloy. Aluminum has a specific conductivity that is an order of magnitude larger than the specific conductivity of stainless steel, for example. Other materials such as beryllium and graphene have even larger specific conductivities. In some implementations, the lengths of tubing 310a-j can include an aluminum and beryllium metal matrix composite (e.g., AlBeMet®) that has a larger specific stiffness and specific conductivity than common aluminum alloys (e.g., 2024-T6 Aluminum or 6061-T6 Aluminum).

FIGS. 4A-4F illustrate transverse cross-sections of example lengths of tubing that can be used in the electromagnetic induction loop (e.g., the loop 300). Each figure depicts a cross-sectional shape and configuration of any additional electrical conductors included in the electromagnetic induction loop; however, the shapes and configurations are not limited to what is shown in FIGS. 4A-4F. For example, the cross-sectional shape of FIG. 4A can be used with the additional electrical conductors of FIG. 4D. Other cross-sectional shapes and configurations are also possible.

Figures 4A, 4B, 4C, 4D, 4E, 4F:
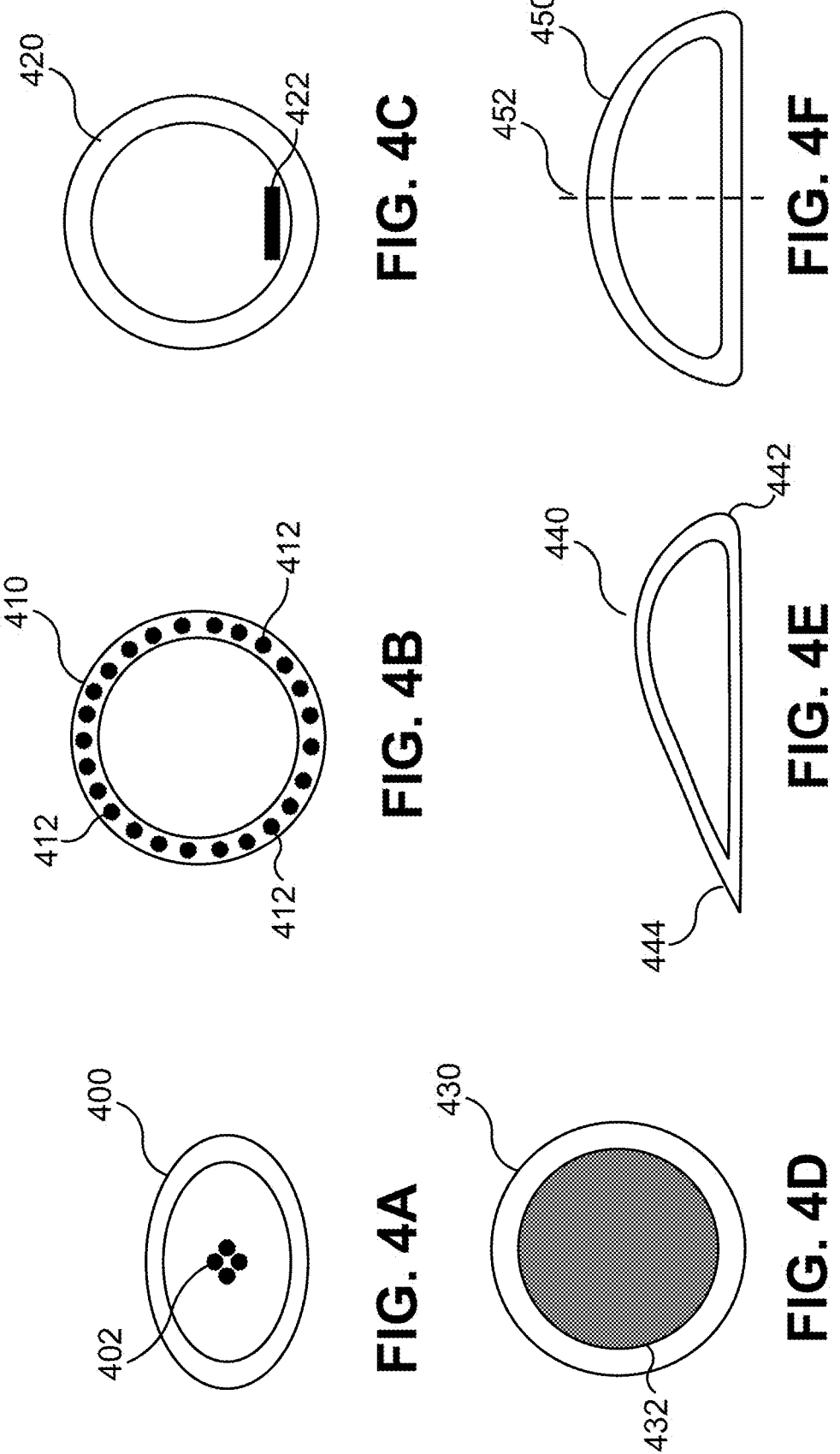
FIGS. 4A-4F illustrate cross-sections of example electromagnetic induction loops.

FIG. 4A illustrates an outer tube 400 with an ellipsoidal shape. The outer tube 400 can include aluminum, aluminum alloys, aluminum composites, beryllium, or graphene. For example, the outer tube can include aluminum with beryllium inclusions. In some implementations, the outer tube 400 can include a graphene composite with a metal matrix having a specific conductivity higher than aluminum.

Wires 402 run through the center of the outer tube 400. In FIG. 4A, four wires 402 are shown; however, any reasonable number of wires can be used. For example, 0 or more wires, 1 or more wires, 2 or more wires, 5 or more wires, 10 or more wires can be used. The wires 402 can carry the current in addition to the outer tubing carrying current. The wires 402 can include a material with a higher specific conductivity than aluminum, for example, copper, beryllium, or graphene. The wires 402 can form one or more continuous coils (e.g., 2 or more coils, 3 or more coils, 5 or more coils, 10 or more coils) through all of the lengths of tubing of the loop. In some implementations, the wires 402 are the length of the tubing. In some implementations, the wires 402 are electrically coupled to the outer tube near the ends of the length of tubing. In some implementations, the lengths of tubing are electrically coupled to one another via the joints.

FIG. 4B illustrates an outer tube 410 with a circular transverse cross-section. The outer tube 410 includes rods 412 of a different material than the outer tube. For example, the base metal of the outer tube can include aluminum or an aluminum alloy, and the rods can include beryllium. The outer tube 410 can be produced by including beryllium rods in the aluminum during an extrusion process of the outer tube 410. Alternatively, the outer tube 410 can be manufactured by placing beryllium rods in a mold and casting aluminum to form the outer tube 410.

FIG. 4C illustrates a circular outer tube 420 with a tape 422 running through the center of the outer tube 420. The tape 422 can include beryllium, graphene, or other material with a higher specific conductivity than the material of the outer tube 420. The tape 422 can be the length of a single length of tubing. In some implementations, the tape 422 is continuous through multiple lengths of tubing.

FIG. 4D illustrates an outer tube 430 with a circular cross-section. The outer tube 430 is filled with a material 432 with a higher specific conductivity than the outer tube 430. For example, the outer tube 430 can include aluminum or an aluminum alloy, and the outer tube 430 can be filled with beryllium. In implementations with a material 432 filling the outer tube 430, the electrical current applied to the outer tube 430 can travel through the filler material 432.

FIG. 4E illustrates an outer tube 440 with a streamlined cross-section. For example, the streamlined cross-section can include an airfoil shape. An airfoil shape for low-speed flight typically includes a rounded leading edge 442 that deflects airflow around the shape and a tapered trailing edge 444. The tapered trailing edge 444 decreases the drag of the shape as compared with a non-tapered shape. The shape of the airfoil can be adjusted to achieve desired characteristics, for example, the thickness and camber of the airfoil can be adjusted to change the lift generated by the shape when in an airflow. A symmetric airfoil is an airfoil without camber. When in an airflow the shape of an airfoil causes the velocity of the air over the top of the shape to increase resulting in a lift force on the airfoil. The streamlined shape of the outer tube 440 can reduce drag on the electromagnetic loop. In some implementations, the streamlined shape (e.g., an airfoil shape) produces lift when in an airflow thereby reducing the effective weight of the electromagnetic loop.

FIG. 4F illustrates an outer tube 450 with a cross-sectional shape that is symmetric about a central vertical axis 452 of the cross section. In the example illustrated in FIG. 4F, the cross-sectional shape is a semi-circle with rounded corners. This type of shape can also reduce drag forces on the electromagnetic loop.

The transverse cross-section can vary along the length of the tubing. For example, the length of tubing can have a larger cross section in the middle of the length than at the ends of the length. In some implementations, the cross-section is constant along the length of the tubing. In some implementations, the length of tubing has a cross-section that changes shape along the length of the tubing. For example, the ends of the length of tubing can have a circular cross-section, and in the middle of the length, the tubing can have a streamlined cross-section. Varying cross-sections along the length of tubing can simplify joint design and assembly of the loop.

In some implementations, lengths of tubing with different cross sections can be used in the electromagnetic loop. For example, referring to FIG. 3, if the length of tubing 310*a* is the leading edge of the electromagnetic loop 300 (e.g., air flows over the loop 300 in the direction from the length of tubing 310*a* to the length of tubing 310*f*), the length of tubing 310*a* can have a streamlined cross-sectional shape (e.g., outer tube 440) to reduce drag. The lengths of tubing 310*c* and 310*d* will experience flow that is closer to parallel with the longitudinal axis of the length of tubing, thus the lengths of tubing 310*c* and 310*d* can have a circular or ellipsoidal cross-section (e.g., the outer tubes 400 or 420).

Figure 5:
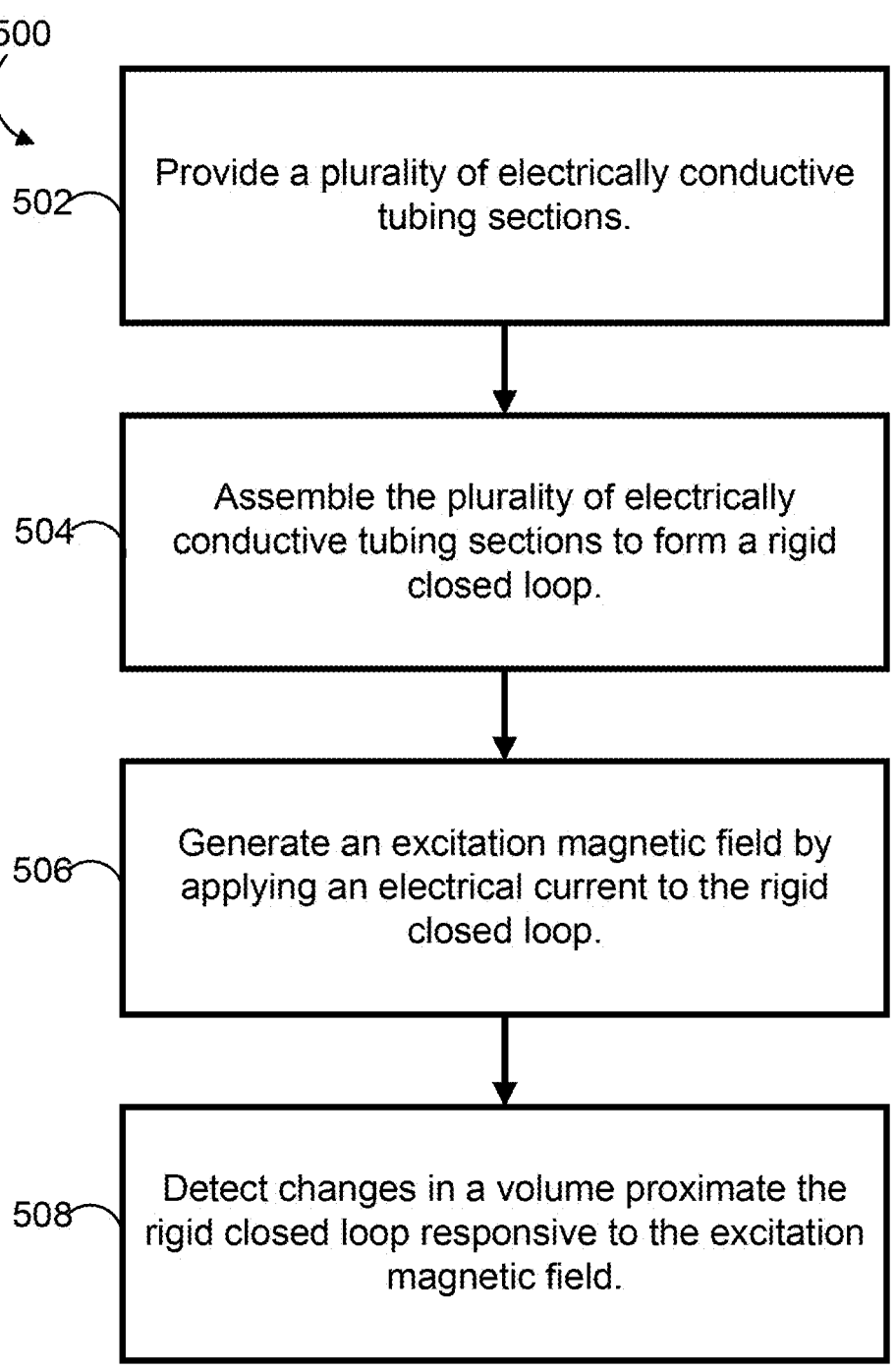
FIG. 5 is a flow chart of an example method for mineral exploration.

FIG. 5 is a flow chart of a method 500 for mineralogical exploration. One or more users (e.g., surveyors, assemblers, operators) provide multiple lengths of electrically conductive tubing having non-circular transverse sections (step 502). The lengths of electrically conductive tubing can include aluminum, beryllium, or graphene. The electrically conductive lengths of tubing can have transverse cross sections as described in reference to FIG. 4.

The one or more users assemble the multiple lengths of electrically conductive lengths of tubing to form a rigid closed loop (step 504). The lengths of tubing can be assembled by joining the lengths of tubing with, for example, press-fit connections, threaded connections or bolted connections. In some implementations, the one or more users insert additional electrical conductors (e.g., one or more electrically conductive wires or tapes, 2 or more electrically conductive wires or tapes, 5 or more electrically conductive wires or tapes) into the rigid closed loop to form coils that can carry electrical current. In some implementations, the lengths of tubing include additional electrical conductors that are shorter than a length of the tubing. The additional electrical conductors can include beryllium, graphene, or other material with a specific conductivity greater than aluminum.

The one or more users apply an electrical current to the rigid, closed loop generating an excitation magnetic field (step 506). The electrical current can be, for example, 1 kA or more, 2 kA or more, 5 kA or more, 10 kA or more, or 30 kA or less. In some implementations, the one or more users couple the additional electrical conductors to the length of tubing to provide a low resistance path for the electrical current for a majority of the length of the tubing. The joint of a length of tubing with another length of tubing can have a higher resistance than the additional electrical conductors. In some implementations, the one or more users control the current by a control module (e.g., the control module 201).

The one or more users detect changes in a volume of earth near the rigid closed loop responsive to the excitation magnetic field (step 508). For example, the one or more users can use detection module 230 to detect changes in an induced current of a receive loop in response to changes of a secondary magnetic field induced by current in the volume of earth induced by the excitation magnetic field.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. An electromagnetic induction system comprising:
a first electrically conducting loop comprising a plurality of lengths of electrically conductive tubing, each length of electrically conductive tubing being at least partially composed of a first electrically conducting composite material with a specific conductivity higher than aluminum, each length of the plurality of lengths of electrically conductive tubing being connected to form a rigid closed loop having a perimeter of 3 meters or more;
a second electrically conducting loop electrically isolated from the first electrically conducting loop; and
a control module comprising a signal generator in electrical communication with the first electrically conducting loop and configured, during operation of the system, to vary a current in the first electrically conducting loop to periodically apply an excitation magnetic field to a volume proximate to the first electrically conducting loop and to detect, using the second electrically conducting loop, changes in a magnetic field generated by a substance in the volume responsive to the excitation magnetic field.

2. The system of claim 1, wherein the first electrically conducting composite material is a metal matrix composite material comprising aluminum and a material with a specific conductivity higher than aluminum.

3. The system of claim 2, wherein the metal matrix composite material comprises aluminum and beryllium.

4. The system of claim 1, wherein a transverse section of at least one of the lengths of electrically conductive tubing comprises an airfoil shape.

5. The system of claim 4, wherein the airfoil shape is a symmetric airfoil shape.

6. The system of claim 1, wherein the first electrically conducting loop further comprises one or more wire loops disposed within the plurality of lengths of electrically conductive tubing, the one or more wire loops comprising a material with a specific conductivity higher than aluminum.

7. The system of claim 1, wherein the second electrically conducting loop comprises a second plurality of lengths of electrically conductive tubing at least partially composed from a second electrically conducting material selected from the group consisting of aluminum, beryllium, and graphene.

8. The system of claim 1, further comprising ropes or cables coupled to the first electrically conducting loop and the second electrically conducting loop, and configured to be coupled to a tow vehicle.

9. A method comprising:
providing a plurality of lengths of electrically conductive tubing, each length of electrically conductive tubing being at least partially composed of a first electrically conducting composite material with a specific conductivity higher than aluminum;
assembling the plurality of lengths of electrically conductive tubing to form a rigid closed electrically conducting loop, the rigid closed electrically conducting loop having a perimeter of 3 meters or more;
generating an excitation magnetic field by applying an electrical current to the rigid closed electrically conducting loop; and
detecting changes in a volume proximate the rigid closed electrically conducting loop responsive to the excitation magnetic field.

10. The method of claim 9, further comprising, inserting one or more wires within the rigid closed electrically conducting loop, the one or more wires comprising a material with a specific conductivity higher than aluminum.

11. The method of claim 9, wherein the assembling comprises joining the plurality of lengths of electrically conductive tubing with threaded connections or press-fit connections.

12. The method of claim 9, wherein applying an electrical current comprises applying an electrical current of at least 1 kA.

13. The method of claim 9, further comprising, controlling the electrical current by a control module.

14. The method of claim 9, further comprising: surveying a geological area by towing the rigid closed electrically conducting loop with an aircraft over the geological area.

15. An electromagnetic surveying system comprising:
a tow assembly connected to an aircraft, the tow assembly comprising:
a first electrically conducting loop comprising a plurality of lengths of electrically conductive tubing, each length of electrically conductive tubing being at least partially composed of a first electrically conducting composite material with a specific conductivity higher than aluminum, each length of the plurality of lengths of electrically conductive tubing being connected to form a rigid closed loop having a perimeter of 3 meters or more;
a second electrically conducting loop electrically isolated from the first electrically conducting loop; and
a control module comprising a signal generator in electrical communication with the first electrically conducting loop and configured, during operation of the system, to vary a current in the first electrically conducting loop to periodically apply an excitation magnetic field to a volume proximate to the first electrically conducting loop and to detect, using the second electrically conducting loop, changes in a magnetic field generated by a substance in the volume responsive to the excitation magnetic field.

16. The system of claim 15, wherein the first electrically conducting composite material is a metal matrix composite material comprising aluminum and a material with a specific conductivity higher than aluminum.

17. The system of claim 16, wherein the metal matrix composite material comprises aluminum and beryllium.

18. The system of claim 15, wherein a transverse section of the plurality of lengths of electrically conductive tubing comprises an airfoil shape.

19. The system of claim 18, wherein the airfoil shape is a symmetric airfoil shape.

20. The system of claim 15, wherein the first electrically conductive loop further comprises one or more wire loops disposed within the plurality of lengths of electrically conductive tubing, the one or more wire loops comprising a material with a specific conductivity higher than aluminum.

21. The system of claim 15, wherein the second electrically conducting loop comprises a second plurality of lengths of electrically conductive tubing at least partially composed from a second electrically conducting material selected from the group consisting of aluminum, beryllium, and graphene.

22. The system of claim 15, wherein the tow assembly further comprises ropes or cables coupled to the first electrically conducting loop, the second electrically conducting loop, and the aircraft.

* * * * *